UNITED STATES PATENT OFFICE.

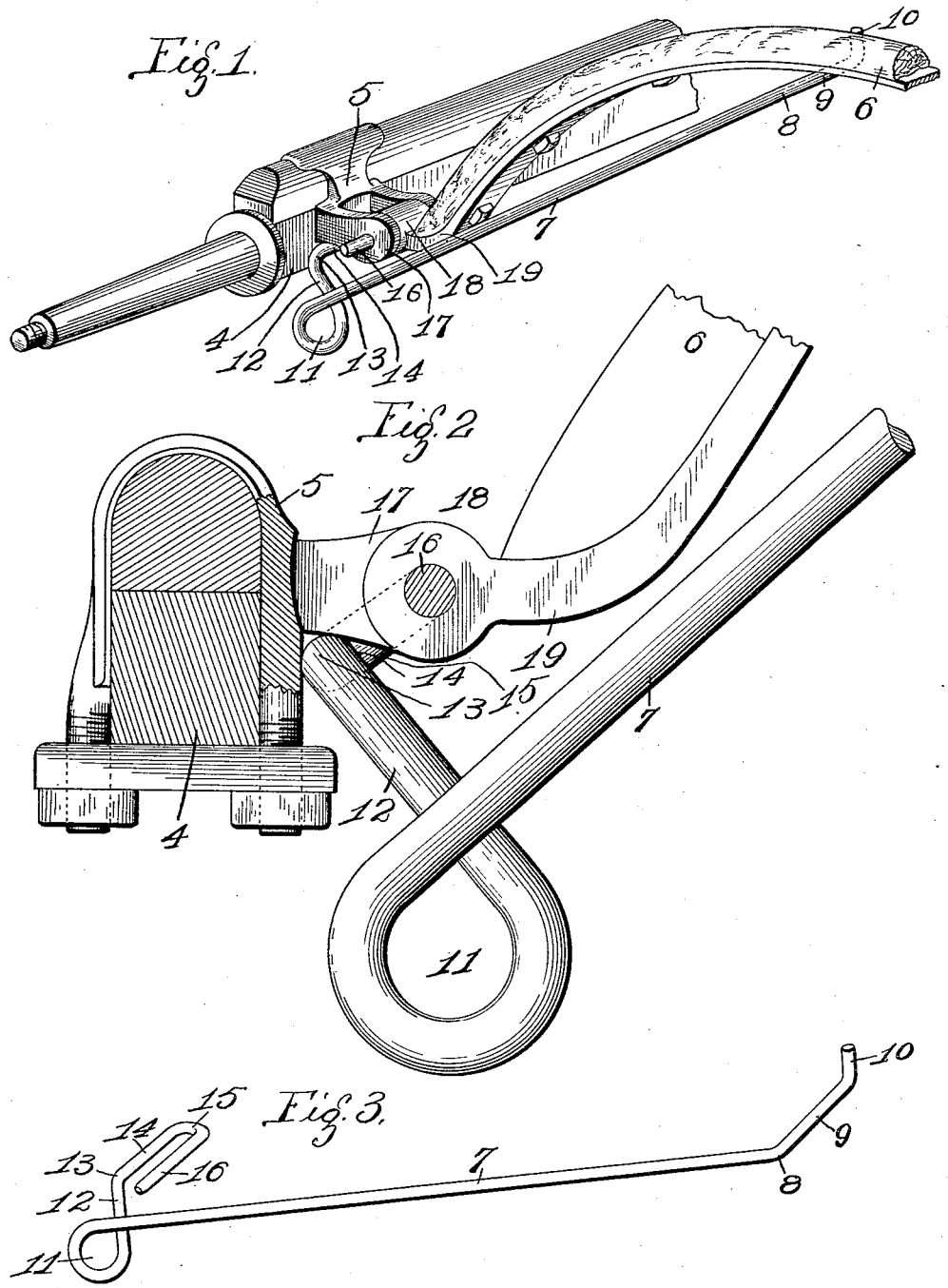

PATRICK S. O'TOOLE, OF ST. LOUIS, MISSOURI.

COMBINATION SHAFT SUPPORT AND ANTIRATTLER.

1,054,137.     Specification of Letters Patent.     Patented Feb. 25, 1913.

Application filed March 2, 1912. Serial No. 681,250.

*To all whom it may concern:*

Be it known that I, PATRICK S. O'TOOLE, a citizen of the United States, and resident of St. Louis, Missouri, have invented certain new and useful Improvements in Combination Shaft Supports and Antirattlers, of which the following is a specification.

This invention relates to improvements in a combination shaft support and anti-rattler and has for its object a strand of spring material suitably bent to contact with the shaft, and also to retain the shaft in position to the thill coupling.

Figure 1 is a perspective view of my invention in its operative position. Fig. 2 is an enlarged detail side view of the lower portion of my device shown in its position with the thill coupling. Fig. 3 is a detail perspective view of my device detached.

Referring to the drawings in detail 4 indicates a vehicle axle, 5 the thill coupling secured to the axle and 6 one member of the shaft. 7 indicates my device, which consists of a rod preferably of spring steel, the same being bent at the point indicated by the numeral 8, forming a shaft supporting portion 9, the end 10 being upturned so as to contact with the side of the shaft and prevent the same from becoming detached. The rod is again bent or formed into a loop 11, its upturned end 12 bent at the point indicated by the numeral 13 forming a horizontal portion 14; this portion is again bent forming a loop 15, and the end 16 being located parallel with the portion 14; this end 16 is passed through the ears 17 of the thill coupling and through the supporting eye 18 formed on the shaft 6, this end 16 acting as the ordinary bolt for supporting the shaft to the thill coupling.

When the device is inserted in a position as shown in Fig. 1 and Fig. 2, and the weight of the shaft contacting with the end 9 of the rod, the portion 14 will contact with the under side of the ears 17 of the thill coupling imparting a downward pressure on the end 16 passing through the ears; this arrangement acting as an anti-rattler to prevent the shaft from rattling between the ears, as the tendency of the shaft is to press upwardly on the end 16 between the ears and downwardly on the end 9 of the rod.

The material out of which these supports are constructed is of sufficient rigidity to support the shaft in a horizontal position so as to relieve its weight from the back of the horse, at the same time holding the shaft in a horizontal position when the vehicle is not in use. The position is such that the device can not become detached on account of the same being in alinement with the bend 19, (see Fig. 1), and in order to remove the device from its position so that the shafts can be removed from the thill coupling, the said shafts must be placed in a vertical position so that the supports can be removed from the thill couplings.

Having thus fully described my invention, what I claim as new and desire to have secured to me by the grant of Letters Patent, is:

A device of the class described comprising a rod having a horizontal bent portion 9, an upturned end 10, said rod provided with a loop 11, a bent portion 14 and a parallel portion 16 in combination with a shaft and thill coupling, the portion 16 supporting the shaft in the thill coupling, the portion 14 contacting with the under side of the ears of the thill coupling and the portion 9 supporting the shaft in an elevated position, substantially as specified.

In testimony whereof, I have signed my name to this specification, in presence of two subscribing witnesses.

PATRICK S. O'TOOLE.

Witnesses:
ALFRED A. EICKS,
WALTER C. STEIN.

---

Copies of this patent may be obtained for five cents each, by addressing the "Commissioner of Patents, Washington, D. C."